(12) United States Patent
Klein et al.

(10) Patent No.: US 8,732,357 B2
(45) Date of Patent: May 20, 2014

(54) APPARATUS AND METHOD FOR DYNAMICALLY ENABLING AND DISABLING WRITE XFR_RDY

(75) Inventors: Steven Edward Klein, Tucson, AZ (US); Matthew Joseph Kalos, Tucson, AZ (US); Sherman Daniel Wayne, Los Angeles, CA (US); Dung Ngoc Dang, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 12/914,024

(22) Filed: Oct. 28, 2010

(65) Prior Publication Data

US 2012/0110222 A1     May 3, 2012

(51) Int. Cl.
*G06F 3/00*      (2006.01)
*G06F 5/00*      (2006.01)

(52) U.S. Cl.
USPC ................................. 710/52; 710/17; 710/57

(58) Field of Classification Search
USPC ................................................. 710/52, 57, 17
See application file for complete search history.

(56) References Cited

U.S. PATENT DOCUMENTS

| | | | |
|---|---|---|---|
| 7,502,873 B2 | 3/2009 | Casper et al. | |
| 7,613,785 B2 | 11/2009 | Chen et al. | |
| 2003/0056000 A1 | 3/2003 | Mullendore et al. | |
| 2005/0114358 A1* | 5/2005 | Chen et al. | 707/100 |
| 2005/0192967 A1 | 9/2005 | Basavaiah et al. | |
| 2006/0004935 A1* | 1/2006 | Seto et al. | 710/62 |
| 2007/0192433 A1 | 8/2007 | Chandrasekaran | |
| 2008/0052728 A1 | 2/2008 | Steinmetz et al. | |
| 2009/0210573 A1 | 8/2009 | Yudenfriend et al. | |
| 2009/0210581 A1 | 8/2009 | Flanagan et al. | |
| 2009/0210884 A1 | 8/2009 | Ricci et al. | |
| 2009/0292850 A1* | 11/2009 | Barrall et al. | 710/301 |
| 2010/0030920 A1 | 2/2010 | Casper et al. | |
| 2010/0037090 A1 | 2/2010 | Inamura | |

FOREIGN PATENT DOCUMENTS

| | | | |
|---|---|---|---|
| JP | 2004171150 A | 6/2004 | |
| JP | 2005267502 A | 9/2005 | |
| JP | 2008129885 A | 6/2008 | |

OTHER PUBLICATIONS

Evans, Mark, "Serial Attached SCSI Architecture: Part 4—The SAS Transport Layer," White Paper, Dec. 2003, URL:http://www.maxtor.com/ files/maxtor/en_us/documentation/white papers_technical/sas transport-layerwhite_paper (retrieved on Oct. 31, 2006).

* cited by examiner

*Primary Examiner* — Zachary K Huson
(74) *Attorney, Agent, or Firm* — Nelson and Nelson; Daniel P. Nelson; Alexis V. Nelson

(57) ABSTRACT

A method for dynamically enabling and disabling use of XFR_RDY is disclosed herein. In one embodiment of the invention, such a method includes receiving a write command at a target and determining whether XFR_RDY is enabled or disabled for the write command. In the event XFR_RDY is disabled, the method determines whether one or more buffers are available at the target. If at least one buffer is available, the method processes the write command by writing data associated with the write command to the one or more buffers. The method then returns information indicating the number of buffers that are still available at the target after completing the write command. A corresponding apparatus and computer program product are also disclosed and claimed herein.

20 Claims, 7 Drawing Sheets

APPARATUS AND METHOD FOR DYNAMICALLY ENABLING AND DISABLING WRITE XFR_RDY

BACKGROUND

1. Field of the Invention

This invention relates to apparatus and methods for dynamically switching between transfer-ready (XFR_RDY) enabled mode and transfer-ready (XFR_RDY) disabled mode.

2. Background of the Invention

During fibre channel protocol (FCP) write operations, XFR_RDY may be used by the FCP target device to notify the FCP initiator that the target device is ready to receive a burst of FCP data. The use of XFR_RDY for the first burst of data is negotiated between two FCP ports at process login (PRLI) time. FCP ports negotiate to either use XFR_RDY on the first burst of FCP data during write operations, or to disable XFR_RDY on the first burst. If XFR_RDY is enabled, then the target device, after receiving an FCP write command, will allocate space for the first burst of FCP data before sending a XFR_RDY message to the initiator. Likewise, the initiator may only send a burst of FCP write data after it has received a XFR_RDY message. If XFR_RDY is disabled, then the initiator assumes that the target device always has x bytes of data available to receive the first burst of data, and the initiator will send write commands immediately followed by FCP data, without waiting for a XFR_RDY message. Operating without XFR_RDY enabled is especially beneficial for applications that are latency bound, such as data replication over long distances.

Modern fibre channel ports typically support at least 4K of concurrent fibre channel exchanges, and at least 64K for each burst of data. Assuming these values, an FCP device that supports XFR_RDY disabled must have at least 64K×4K=256 MB of memory per port available to receive the first burst of data. This is a large amount of memory, especially considering that modern storage controllers may support upwards of 128 ports, which translates into 32 GB (256 MB×128 ports) of memory reserved for first bursts of data. Not all storage controllers have the resources available to reserve this much memory to receive first bursts of data with XFR_RDY disabled. Without guaranteeing enough buffer space available to receive the first bursts of data, a storage controller that needs to be able to operate with XFR_RDY disabled has the following options:

The first option is to not support operation in XFR_RDY disabled mode. This is the option implemented by most fibre channel devices. However, this option is not viable in many configurations, such as configurations that replicate data over long distances, since it unacceptably impacts write performance. This is due to the fact that disabling XFR_RDY requires the initiator to wait for a XFR_RDY message from the target before a data transfer can occur. Such a delay is unacceptable in many configurations.

The second option is to support a limited number of exchanges between an initiator and target. This option is not viable in competitive environments where oversubscription is common. Most controllers need to support a larger number of initiators logged in per port, with each initiator sending a large number of exchanges concurrently.

The third option is to support operation in XFR_RDY disabled mode, but to limit the size of the first burst of data. This option is not viable for storage controllers with cache track-based architectures, which may be configured to send an XFR_RDY message for each 64K track. There is therefore a need to have a burst size that is able to support a minimum of 64K.

The fourth option is to support operation in XFR_RDY disabled mode, but not guarantee that there are enough buffers to accommodate the maximum number of concurrent write transfers that may occur with XFR_RDY disabled. In other words, the target device is configured to allow the oversubscription of the buffer space available. This option relies on the fact that, most of the time, the workload will not require all resources. However, if the workload is high enough, and more buffer space is required than is physically available, the target controller must either discard or abort exchanges. This leads to I/O errors, and results in performance degradation and possible SAN congestion with its various consequences, including impacting other devices in the SAN.

The fifth option is for the FCP ports to negotiate the disabling of XFR_RDY during process login. When buffer space falls below a certain threshold, the target is configured to drop new incoming exchanges and/or log out the host. This may force the host to log in again, at which time the FCP ports can renegotiate to enable XFR_RDY. This option requires terminating all I/O before XFR_RDY usage can be enabled or disabled, causing undesirable performance degradation.

In view of the foregoing, what is needed is a solution that allows a device to take advantage of the performance gains possible with XFR_RDY disabled, while not requiring that a maximum supported number of FCP write operations can run concurrently. Further needed is a solution that can efficiently enable and disable XFR_RDY with minimal write performance degradation. Ideally, such a solution would allow a device to enable and disable XFR_RDY as workloads vary, and on an exchange-to-exchange basis.

SUMMARY

The invention has been developed in response to the present state of the art and, in particular, in response to the problems and needs in the art that have not yet been fully solved by currently available apparatus and methods. Accordingly, the invention has been developed to provide apparatus and methods to dynamically enable and disable use of XFR_RDY. The features and advantages of the invention will become more fully apparent from the following description and appended claims, or may be learned by practice of the invention as set forth hereinafter.

Consistent with the foregoing, a method for dynamically enabling and disabling use of XFR_RDY is disclosed herein. In one embodiment of the invention, such a method includes receiving a write command at a target and determining whether XFR_RDY is enabled or disabled for the write command. In the event XFR_RDY is disabled, the method determines whether one or more buffers are available at the target. If at least one buffer is available, the method processes the write command by writing data associated with the write command to the one or more buffers. The method then returns information indicating the number of buffers that are still available at the target after completing the write command.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings.

Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
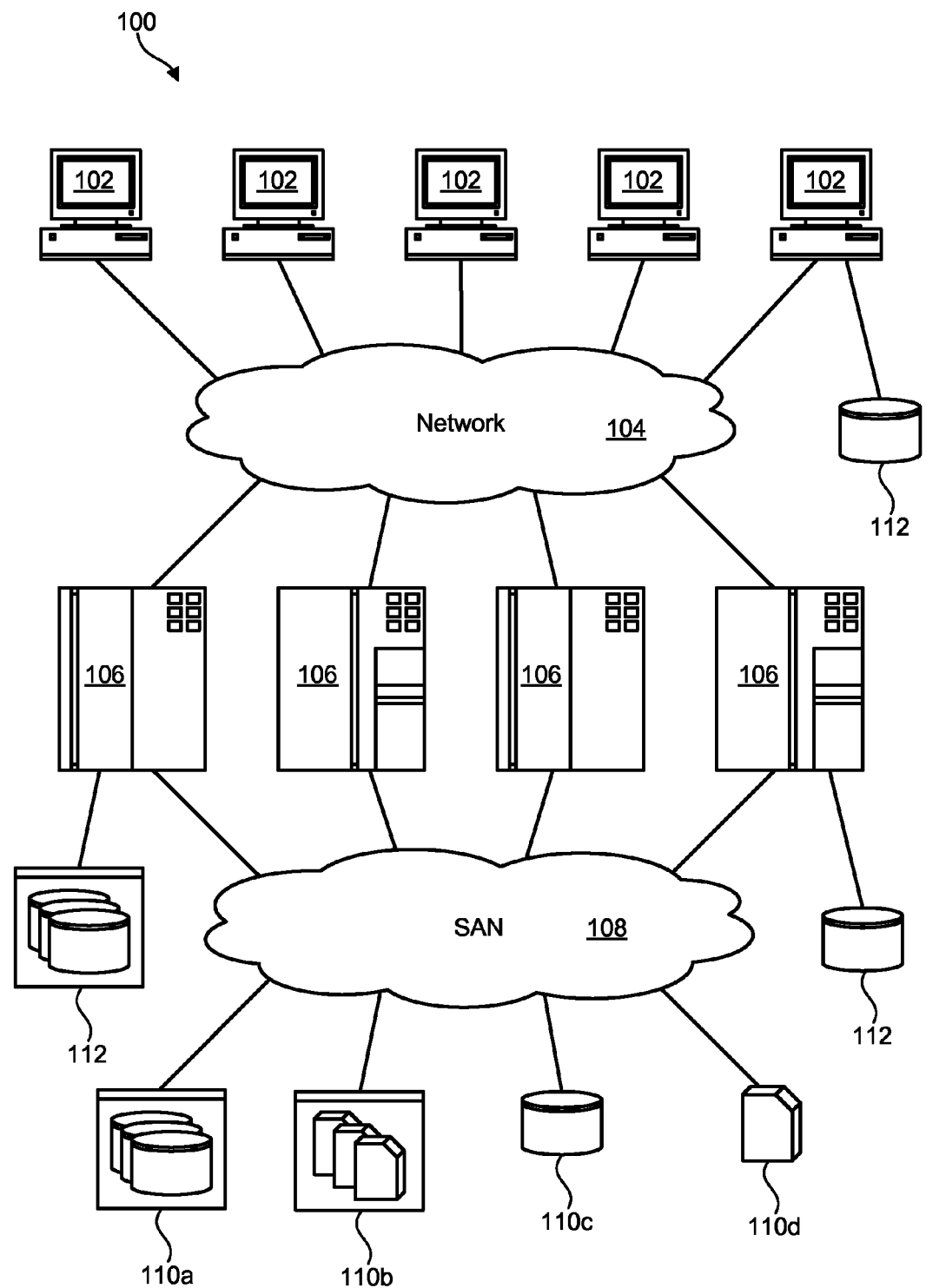
FIG. 1 is a high-level block diagram showing one example of a network environment where an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented only by way of example and is not intended to be limiting. Indeed, the apparatus and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110*a* of hard-disk drives or solid-state drives, tape libraries 110*b*, individual hard-disk drives 110*c* or solid-state drives 110*c*, tape drives 110*d*, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
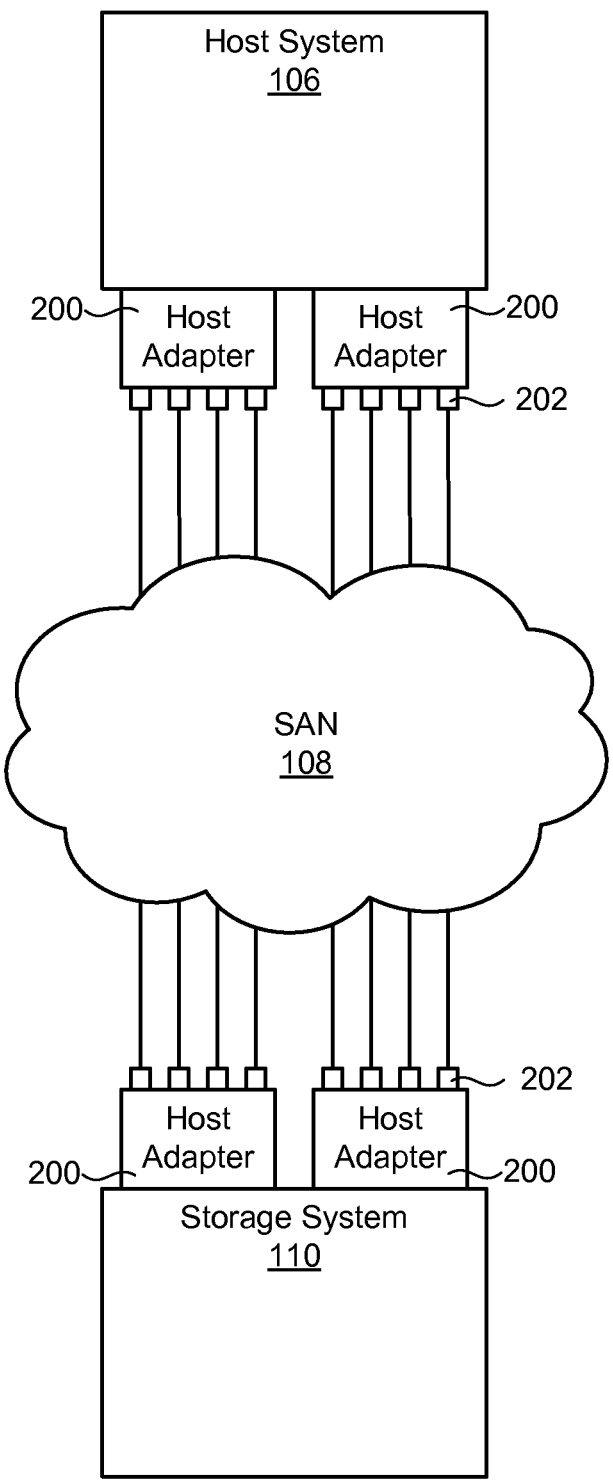
FIG. 2 is a high-level block diagram showing components for enabling communication between network devices.

Referring to FIG. 2, each host system 106 and storage system 110 may include one or more host adapters 200 to communicate with other host systems 106 and storage systems 110 over a storage network 108. In certain embodiments, the host adapters 200 are embodied as adapter cards plugged into expansions slots of the host systems 106 and storage systems 110, respectively, although this is not mandatory in all embodiments. The host adapters 200 on the host systems 106 and storage systems 110 may include one or more ports 202 to facilitate communication. For the purposes of this description, a port 202 that initiates communication (e.g., by sending a command) may be referred to as an "initiator" whereas a port 202 that receives and responds to the communication may be referred to as a "target." A high-level block diagram showing one example of an initiator 300 and a target 302 is illustrated in FIG. 3.

Figure 3:
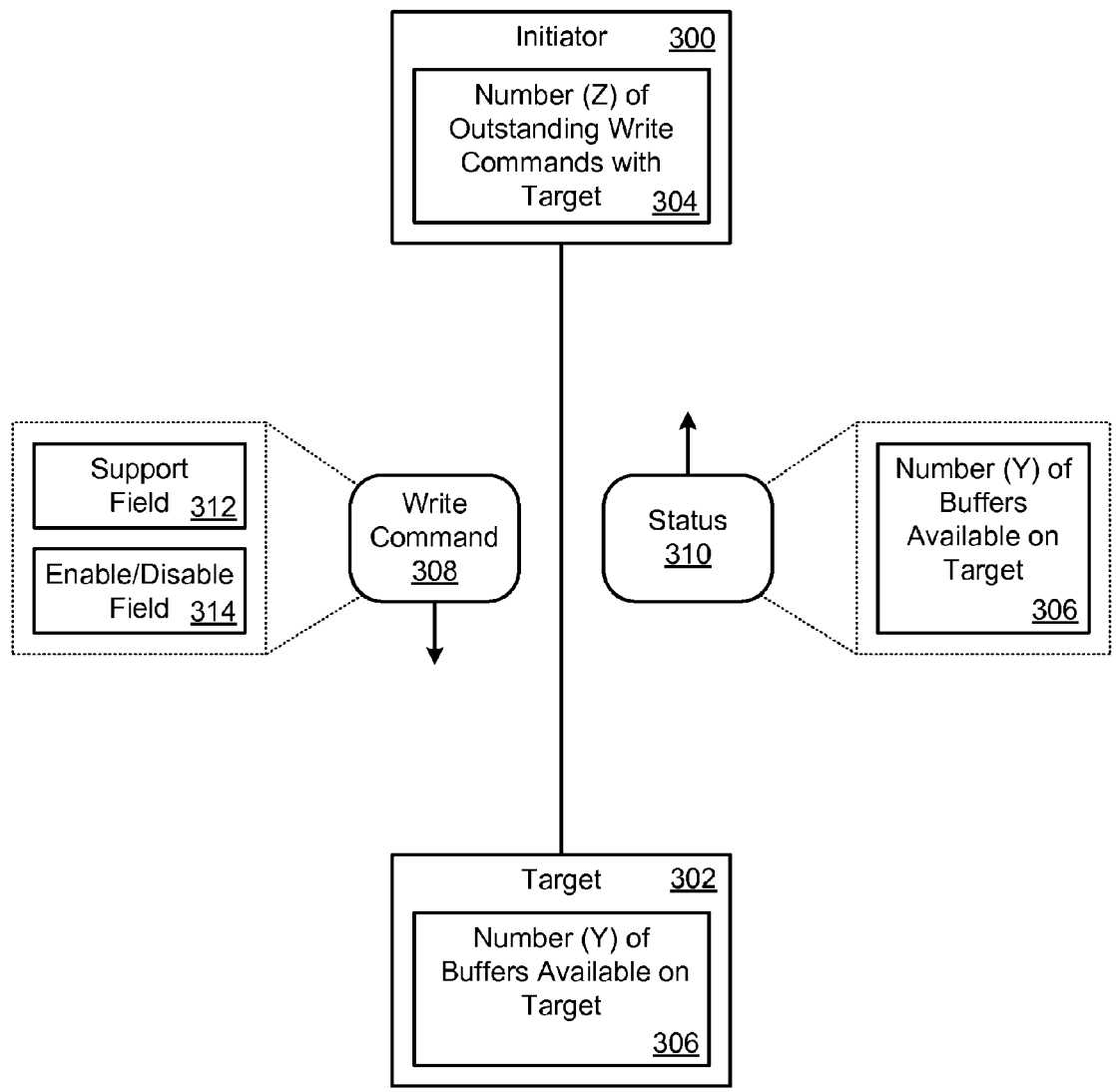
FIG. 3 is a high-level block diagram showing communication between an initiator and target.

Referring to FIG. 3, as discussed in the background section above, during fibre channel protocol (FCP) write operations, XFR_RDY may be used by an FCP target 302 to notify an FCP initiator 300 that the target 302 is ready to receive a burst of FCP data. The use of XFR_RDY for the first burst of data may be negotiated between two FCP ports 202 at process login (PRLI) time. FCP ports 202 may negotiate to either use XFR_RDY on the first burst of FCP data during write operations, or to disable XFR_RDY on the first burst. If XFR_RDY is enabled, then the target 302, after receiving an FCP write command, will allocate space for the first burst of FCP data before sending a XFR_RDY message to the initiator 300. Likewise, the initiator 300 may only send a burst of FCP write data after it has received a XFR_RDY message. If XFR_RDY is disabled, then the initiator 300 assumes that the target device 302 always has x bytes of data available to receive the first burst of data, and the initiator 300 will send write commands immediately followed by up to x bytes of FCP data, without waiting for a XFR_RDY message.

As described in the background section, operating without XFR_RDY enabled is beneficial for configurations that are latency bound, such as data replication over long distances (e.g., peer-to-peer remote copy applications, or PPRC, for example). Nevertheless, as further discussed above, not all storage controllers have the resources available to reserve the large amounts of memory needed to receive first bursts of data with XFR_RDY disabled. Consequently, a solution is needed to enable a device to take advantage of the performance advantages of having XFR_RDY disabled for a limited number of write operations. Further needed is a solution to dynamically enable and disable the use of XFR_RDY with minimal write performance degradation. Ideally, such an apparatus and method would allow a device to enable and disable XFR_RDY as workloads vary, and on an exchange-to-exchange basis.

FIG. 3 shows a general overview of a technique for dynamically enabling and disabling the use of XFR_RDY. This technique will be described in more detail in association with FIGS. 4 and 5. This technique allows the initiator 300 and target 302 to take advantage of the performance gains associated with disabling XFR_RDY for a limited number of write operations.

As shown in FIG. 3, in selected embodiments, the initiator 300 may be configured to keep track of the number 304 of outstanding write commands 308 (with XFR_RDY disabled) that it has with a target 302. Outstanding write commands 308 may include those write commands that the initiator 300 has sent to the target 302 but has still not received status 310 indicating whether the write commands 308 succeeded or failed. In certain embodiments, each write command 308 that the initiator 300 sends to the target 302 may include a support field 312 and an enable/disable field 314.

The support field 312 indicates whether the initiator 300 supports the dynamic enabling and disabling of XFR_RDY. In certain embodiments, the support field 312 is a single a bit. The bit may be selected or configured such that targets 302 that do not support dynamic enabling and disabling of XFR_RDY will not see the bit. When the bit is set, the initiator 300 may indicate that it supports two things: (1) status messages 310 indicating that a write command 308 with XFR_RDY disabled failed and should be re-driven with XFR_RDY enabled; and (2) status messages 310 indicating that a write operation completed successfully, wherein the status messages 310 include information indicating the number 306 of buffers that are available on the target 302 to service write operations with XFR_RDY disabled from the initiator 300.

In other embodiments, methods other than or in addition to using a support field 312 may be used to establish whether the initiator 300 and target 302 support the dynamic enabling and disabling of XFR_RDY. For example, the initiator 300 and target 302 may negotiate whether dynamic enabling and disabling of XFR_RDY is supported during the login phase, or as part of a features exchange protocol or other suitable protocol. In other embodiments, the support field 312 may be included in a frame header or other suitable location, as opposed to in the write command 308.

The initiator 300 may set the enable/disable field 314 to indicate whether XFR_RDY is enabled or disabled for the particular write command 308 in which it is contained. If XFR_RDY is enabled, then the initiator 300 will wait for a XFR_RDY message from the target 302 before sending data associated with the write command 308. If, on the other hand, XFR_RDY is disabled, then the initiator 300 will send data after the write command 308 without waiting for an XFR_RDY message from the target 302. In certain embodiments, instead of providing the enable/disable field 314 in the write command 308, the enable/disable field 314 is included in a control field of a frame header or other suitable location.

The target 302 may be configured to keep track of the number (Y) 306 of buffers it has available to service write commands 308 from the initiator 300. In certain embodiments, the target 302 maintains a different value of "Y" for each initiator 300 that is logged in with the target 302. The target 302 may change the value of "Y" dynamically based on the number of write commands 308 in progress and the number of initiators 300 logged in with the target 302. The target 302 may also change the value of "Y" for other reasons, such as needing to use buffers for other operations on the target device 302. The current value of "Y" is a snapshot of the number of buffers available on the target 302 for an initiator 300 at any particular time.

When a write command 308 is processed by the target 302, the target 302 may respond with status 310 indicating the success or failure of the write operation 308. The status message 310 (or another message, depending on the desired implementation) may indicate the number 306 of buffers that are still available on the target 302 after completing the write command 308. Using this information 306, the initiator 300 may compare the number 306 of buffers available on the target 302 with the number 304 of outstanding write commands it has with the target 302. This comparison may be made to determine the operating mode (i.e., whether XFR_RDY is enabled or disabled) for the next write command 308 the initiator 300 sends to the target 302.

For example, if the number 306 of buffers available on the target 302 is greater than the number 304 of outstanding write commands the initiator 300 has with the target 302, the initiator 300 may send the next write command 308 with XFR_RDY disabled. If, on the other hand, the number 306 of buffers available on the target 302 is less than or equal to the number 304 of outstanding write commands the initiator 300 has with the target 302, the initiator 300 may send the next write command 308 with XFR_RDY enabled. Enabling XFR_RDY will allow the target 302 to allocate a buffer prior to receiving data associated with a write command 308.

Figure 4:
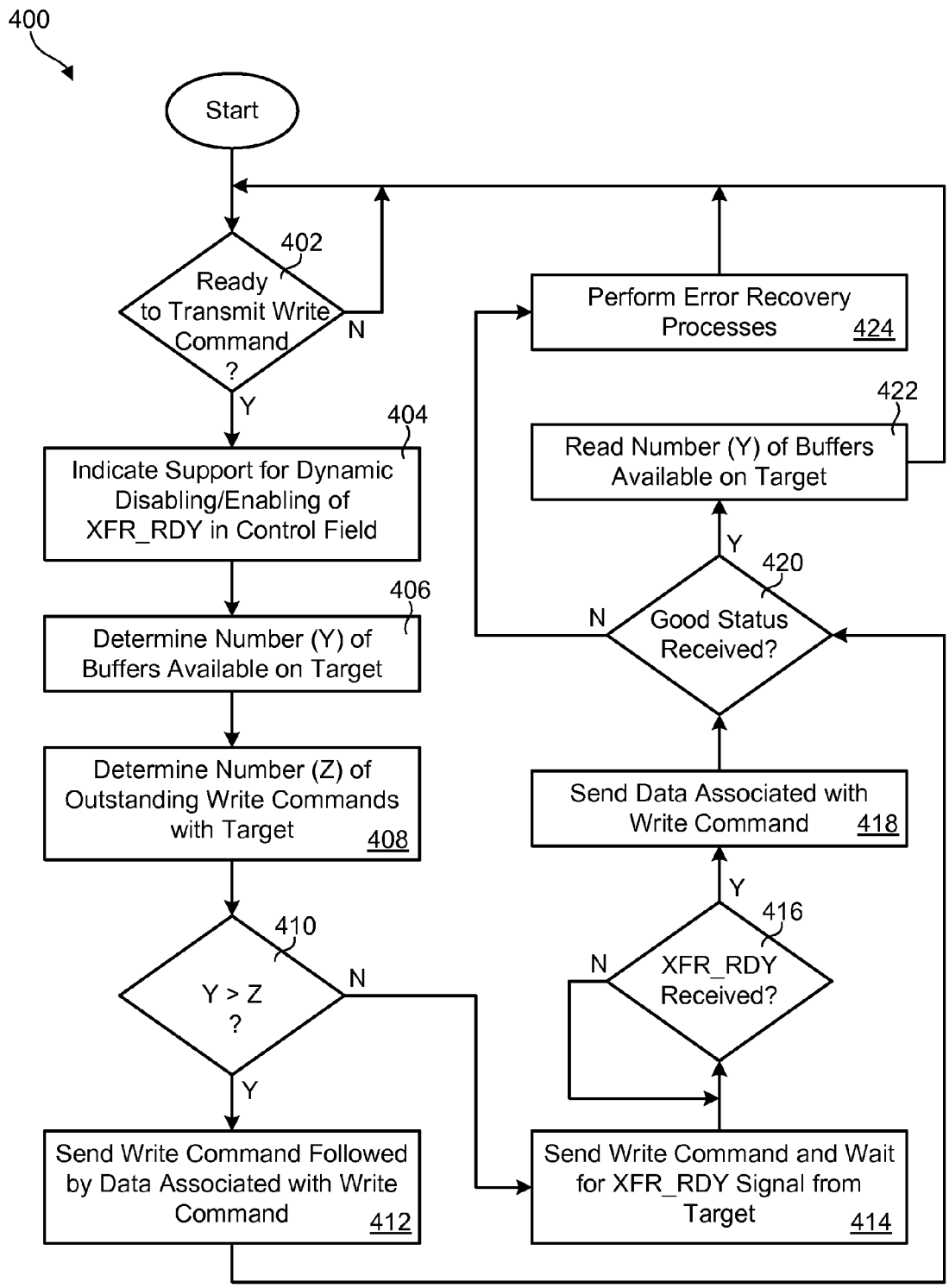
FIG. 4 is a flow diagram showing one embodiment of a method implemented by an initiator that supports dynamic enabling and disabling of XFR_RDY.

Referring to FIG. 4, one embodiment of a method 400 implemented by an initiator 300 that supports dynamic enabling and disabling of XFR_RDY is illustrated. As shown, the initiator 300 initially determines 402 whether it is ready to transmit a write command. This may occur if the initiator 300 receives data that needs to be written to a target device 302. The initiator 300 then indicates 404 that it supports dynamic enabling and disabling of XFR_RDY in a control field 312 of the write command 308. As previously mentioned, this control field 312 may be selected such that targets 302 that do not support dynamic enabling and disabling of XFR_RDY either do not see the control field 312 or ignore it.

The initiator 300 then determines 406 the number 306 of buffers that are available on the target 302. This may be accomplished by reading a value of Y maintained by the initiator 300. In certain embodiments, the initiator 300 initializes its internal value of Y to a desired value and then updates Y as the number 306 of available buffers is received from the target 302 in status messages 310 or other suitable messages. The initiator 300 also determines 408 the number 304 of outstanding write commands it has with the target 302. The initiator 300 may keep track of this number 304 as it sends write commands 308 to the target 302 and receives status messages 310 from the target 302.

If, at step 410, the number (Y) 306 of buffers available on the target 302 is greater than the number (Z) 304 of outstanding write commands the initiator 300 has with the target 302, the initiator 300 sends 412 the write command 308 with XFR_RDY disabled. The initiator 300 then sends 412 data associated with the write command 308 to the target 302 without waiting for a XFR_RDY message from the target 302. If, at step 410, the number 306 of buffers available on the target 302 is less than or equal to the number 304 of outstanding write commands the initiator 300 has with the target 302, the initiator 300 sends 414 the write command 308 with XFR_RDY enabled. The initiator 300 then waits 416 to receive a XFR_RDY message from the target 302. Once the initiator 300 receives a XFR_RDY message, the initiator 300 sends 418 data associated with the write command 308 to the target 302.

Once the initiator 300 has sent data at steps 412 or 418, the initiator 300 waits 420 to receive status 310 from the target 302. If the status is good, meaning that the write operation completed successfully, the initiator 300 reads 422 the number of buffers available at the target 302 from the status message 310. This information allows the initiator 300 to enable or disable XFR_RDY for future write commands 308 accordingly. If, on the other hand, the status is not good, meaning that the write command 308 did not complete successfully, the initiator 300 may perform 424 error recovery processes. This may include re-driving the write command 308 down the same or another path after a short waiting period, for example. Alternatively, or additionally, this may include re-driving the write command 308 with XFR_RDY enabled if the status message 310 directs the initiator 300 to do so. When the initiator 300 is informed that the write command 308 did not complete successfully, the initiator 300 may set its internal value of Y to zero to reflect that no buffers are currently available on the target 302. Alternatively, the target 302 may inform the initiator 300 that no buffers are available so that it can update its value of Y. The initiator 300 may then repeat the method 400 for the next write command 308.

Figure 5:
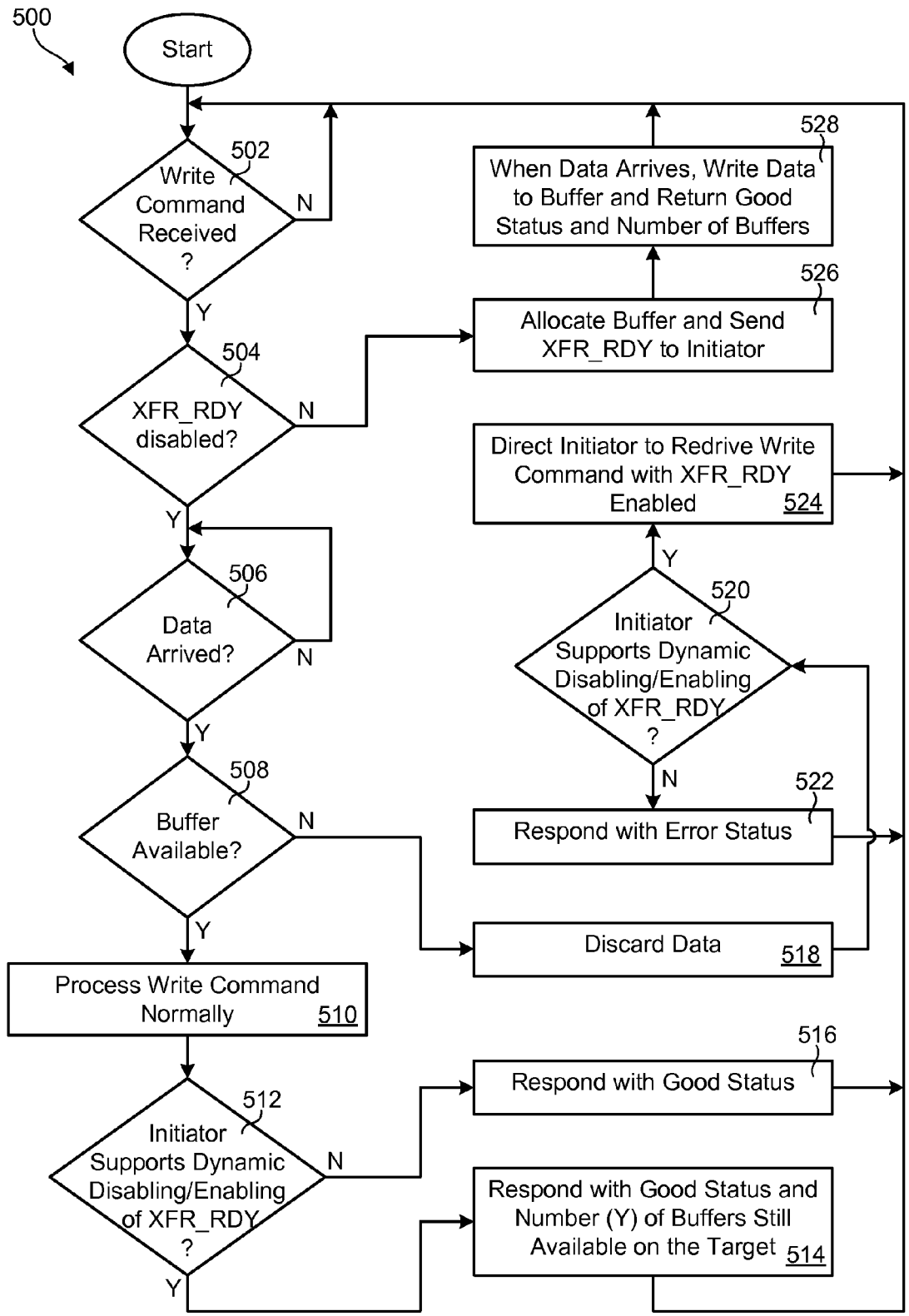
FIG. 5 is a flow diagram showing one embodiment of a method implemented by a target that supports dynamic enabling and disabling of XFR_RDY.

Referring to FIG. 5, one embodiment of a method 500 implemented by a target 302 supporting dynamic enabling and disabling of XFR_RDY is illustrated. As shown, a target 302 initially determines 502 whether a write command 308 has been received. If a write command 308 has been received 502, the target 302 determines 504, by examining the write command 308, whether XFR_RDY is disabled. If XFR_RDY is not disabled, the target 302 allocates 526 a buffer and sends 526 XFR_RDY to the initiator 300. When data arrives from the initiator 300, the target 302 writes the data to the buffer and returns 528 status 310 to the initiator 300 indicating the success or failure of the write operation as well as the number 306 of buffers that are still available on the target after completing the write operation.

If, at step 504, XFR_RDY is disabled, the target 302 waits 506 for data associated with the write command 308 to arrive without sending XFR_RDY. When the data arrives, the target 302 determines 508 whether one or more buffers are available on the target 302. If one or more buffers are available, the target 302 processes 510 the write command 308 by writing the data to a buffer. The target 302 then determines 512 whether the initiator 300 supports dynamic enabling and disabling of XFR_RDY. This may be accomplished by reading the support field 312 in the write command 308. If so, the target 302 responds 514 with good status 310 (assuming the write operation completed successfully) that indicates the number 306 of buffers that are still available on the target 302. If, on the other hand, the initiator 300 does not support dynamic enabling and disabling of XFR_RDY, the target 302 simply responds 516 with good status (assuming that the write operation completed successfully).

If, at step 508, the target 302 determines that no buffers are available to hold data associated with the write command 308, the target 302 discards 518 data associated with the write command 308 as it is received, since the target 302 does not have the resources to store the data. The target 302 then determines 520 whether the initiator 300 supports dynamic enabling and disabling of XFR_RDY. If not, the target 302 responds with error status 310. This allows the initiator 300 to invoke error recovery processes to respond to the error status 310. If, at step 520, the target 302 determines that the initiator 300 supports dynamic enabling and disabling of XFR_RDY, the target 302 directs 524 the initiator 300 to re-drive the write command 308 with XFR_RDY enabled. Re-driving the write command 308 with XFR_RDY enabled will allow the target 302 time to allocate a buffer before it receives the data.

The methods 400, 500 presented in FIGS. 4 and 5 are presented only by way of example and are not intended to be limiting. One of skill in the art will recognize that various alterations may be made to the methods 400, 500 without departing from the essence or characteristics of the invention. The methods 400, 500 are simply presented to show examples of methods 400, 500 that may be executed by the initiator 300 and target 302 respectively.

Figure 6:
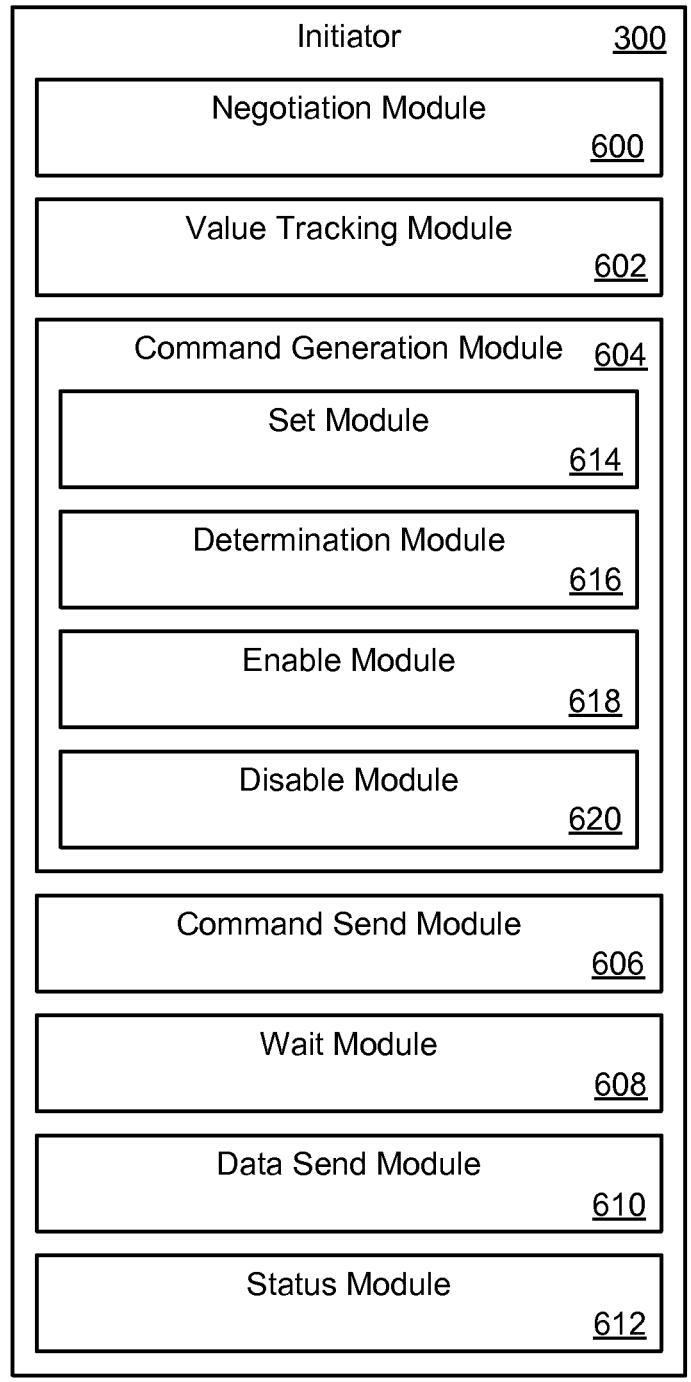
FIG. 6 is a high-level block diagram showing various modules that may be implemented within an initiator that supports the dynamic enabling and disabling of XFR_RDY.
Figure 7:
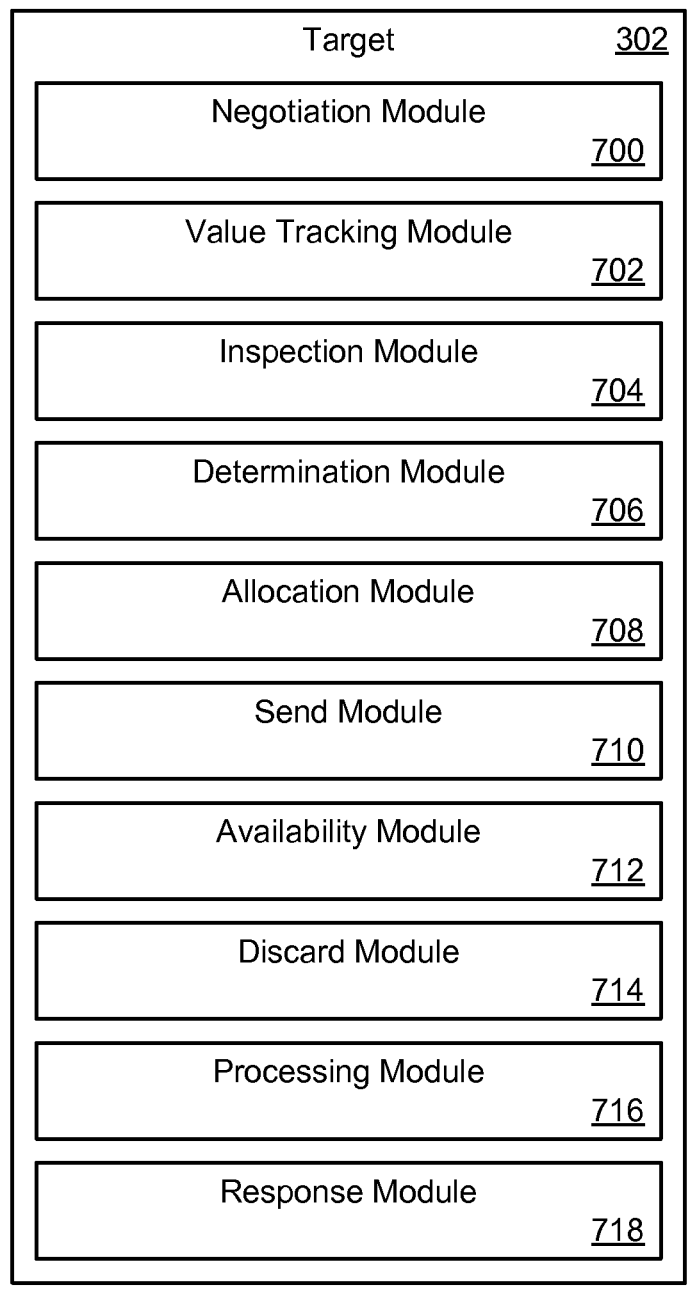
FIG. 7 is a high-level block diagram showing various modules that may be implemented within a target that supports the dynamic enabling and disabling of XFR_RDY.

Referring to FIGS. 6 and 7, the methods 400, 500 described in FIGS. 4 and 5 may be implemented in the form of one or more modules. These modules may be implemented in hardware, software or firmware executable on hardware, or a combination thereof. These modules are presented only by way of example and are not intended to be limiting. Indeed, alternative embodiments may include more or fewer modules than those illustrated. It should also be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in an initiator 300 may actually be implemented in a target 302 and vice versa. Thus, the location of the modules is presented only by way of example and is not intended to be limiting.

FIG. 6 is a high-level block diagram showing various modules that may be included within an initiator 300 that supports dynamic enabling and disabling of XFR_RDY. As shown in FIG. 6, in selected embodiments, such an initiator 300 may include one or more of a negotiation module 600, a value tracking module 602, a command generation module 604, a command send module 606, a wait module 608, a data send module 610, and a status module 612. The command generation module 604 may include one or more of a set module 614, a determination module 616, an enable module 618, and a disable module 620.

The negotiation module 600 of the initiator 300 may be used to negotiate with a corresponding negotiation module 700 (illustrated in FIG. 7) of the target 302. In certain embodiments, the negotiation between the negotiation modules 600, 700 occurs at process login time. Using the negotiation modules 600, 700, the initiator 300 and target 302 may negotiate whether operation in XFR_RDY disabled mode is supported. The initiator 300 and target 302 may also negotiate whether the dynamic enabling and disabling of XFR_RDY is supported.

A value tracking module 602 may be used to track the number 304 of outstanding write commands 308 with a target 302. When a new write command 308 with XFR_RDY disabled is sent to the target 302, the value tracking module 602 may increment the number 304. Similarly, when status 310 is returned for an outstanding write command with XFR_RDY disabled, the value tracking module 602 may decrement the number 304. The value tracking module 602 may also keep track of the number 306 of buffers that are available on the target 302. This may be accomplished, for example, by reading the number 306 of buffers that are available as status messages 310 are received from the initiator 300.

A command generation module 604 may be used to generate and populate write commands 308 for transmission to the target 302. To accomplish this task, a set module 314 may set the support field 312 in the write command 308 to indicate 404 that the initiator 300 supports dynamic enabling and disabling of XFR_RDY. A determination module 616 may then determine how to set the enable/disable field 314. More specifically, the determination module 616 may determine whether the number 306 of buffers available on the target 302 is greater than the number 304 of outstanding write commands the initiator 300 has with the target 302. If so, a disable module 620 sets the enable/disable field 314 to disable XFR_RDY for the write command 308. If not, the enable module 618 sets the enable/disable field 314 to enable XFR_RDY.

Once the write command 308 is generated by the command generation module 604, a command send module 606 sends the write command 308 to the target 302. If XFR_RDY is enabled in the write command 308, a wait module 608 waits for an XFR_RDY message from the target 302. Once this message is received, a data send module 610 sends data associated with the write command 308 to the target 302, such as by sending the data in one or more frames. If, on the other hand, XFR_RDY is disabled, the data send module 610 may send the data without waiting for an XFR_RDY message. Once data has been sent by the data send module 610, a status module 612 waits for and reads status information 310 from the target 302. This may include reading, from the status information 310, the number 306 of buffers that are still available on the target 302 after completing the write operation.

FIG. 7 is a high-level block diagram showing various modules that may be included within a target 302 that supports dynamic enabling and disabling of XFR_RDY. As shown in FIG. 7, in selected embodiments, such a target 302 includes one or more of a negotiation module 700, a value tracking module 702, an inspection module 704, a determination module 706, an allocation module 708, a send module 710, an availability module 712, a discard module 714, a processing module 716, and a response module 718.

As previously mentioned, the negotiation module 700 of the target 302 may negotiate with the negotiation module 600 of the initiator 300, at process login time, to determine whether certain features are supported. More specifically, the negotiation module 700 may negotiate as to whether operating in XFR_RDY disabled mode is supported, as well as whether dynamic enabling and disabling of XFR_RDY is supported. The value tracking module 702 may track the number 306 of buffers that are available on the target 302. When a buffer is utilized, the value tracking module 702 may decrement the number 306. Similarly, when a buffer becomes available on the target 302, the value tracking module 702 may increment the number 306.

The inspection module 704 may be used to inspect an incoming write command 308. In particular, the inspection module 704 may be configured to inspect the support field 312 and enable/disable field 314 of the incoming write command 308. Using the information in these fields 312, 314, a determination module 706 may determine whether the initiator 300 supports the dynamic enabling and disabling of XFR_RDY, and whether XFR_RDY is enabled or disabled for the write command 308. If XFR_RDY is enabled for the write command 308, the allocation module 708 allocates a buffer for data associated with the write command 308 and a send module 710 sends a XFR_RDY message to the initiator 300 indicating that a buffer has been allocated and that the target 302 is ready to receive the data.

If, on the other hand, the determination module 706 determines that XFR_RDY is disabled for the write command 308, the target 302 may simply wait for the data associated with the write command 308 to arrive. When the data arrives, an availability module 712 may determine whether at least one buffer is available on the target 302 to receive the data. If no buffer is available, a discard module 714 may discard the data as it is received from the initiator 300. If at least one buffer is available, a processing module 716 may process the write command 308 by writing the data associated with the command 308 to the at least one buffer. A response module 718 may then send status 310 to the initiator 300 indicating the result of the write operation. The response module 718 may include, in the status 310, information indicating the number of buffers that are still available on the target 302 after completing the write operation.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for dynamically enabling and disabling operation in transfer ready (XFR_RDY) mode, the method comprising:
   receiving, from an initiator, a write command at a target, the target comprising a plurality of buffers for processing write commands;
   determining whether XFR_RDY is disabled for the write command;
   in the event XFR_RDY is disabled, determining whether at least one buffer from the plurality of buffers is available on the target;
   in the event at least one buffer is available, processing the write command by writing data associated with the write command to the at least one buffer;
   calculating, at the target, a total number of buffers that are still available on the target after processing the write command; and
   transmitting the total number to the initiator.

2. The method of claim 1, further comprising, in the event at least one buffer is not available, discarding data associated with the write command at the target.

3. The method of claim 2, wherein discarding data further comprises returning status indicating that the write command failed and should be re-driven with XFR_RDY enabled.

4. The method of claim 1, wherein, prior to transmitting another write command with XFR_RDY disabled to the target, the initiator determines if the total number of buffers still available on the target is greater than a number of outstanding write commands the initiator has with the target.

5. The method of claim 4, wherein the initiator is configured to transmit another write command with XFR_RDY disabled if the initiator determines that the total number of buffers still available on the target is greater than the number of outstanding write commands the initiator has with the target.

6. The method of claim 4, wherein the initiator is configured to transmit a write command with XFR_RDY enabled if the initiator determines that the total number of buffers still available on the target is not greater than the number of outstanding write commands the initiator has with the target.

7. A computer program product to dynamically enable and disable operation in transfer ready (XFR_RDY) mode, the computer program product comprising a non-transitory computer-readable storage medium having computer-usable program code embodied therein, the computer-usable program code comprising:
   computer-usable program code to receive, from an initiator, a write command at a target, the target comprising a plurality of buffers for processing write commands;
   computer-usable program code to determine whether XFR_RDY is disabled for the write command;
   computer-usable program code to, in the event XFR_RDY is disabled, determine whether at least one buffer from the plurality of buffers is available on the target;
   computer-usable program code to, if at least one buffer is available, process the write command by writing data associated with the write command to the at least one buffer;
   computer-usable program code to calculate, at the target, a total number of buffers that are still available on the target after processing the write command; and
   computer-usable program code to transmit the total number to the initiator.

8. The computer program product of claim 7, further comprising computer-usable program code to, if at least one buffer is not available, discard data associated with the write command.

9. The computer program product of claim 8, wherein discarding data further comprises returning status indicating that the write command failed and should be re-driven with XFR_RDY enabled.

10. The computer program product of claim 7, further comprising computer-usable program code on the initiator to, prior to transmitting another write command with XFR_RDY disabled to the target, determine if the total number of buffers still available on the target is greater than a number of outstanding write commands with the target.

11. The computer program product of claim 10, further comprising computer-usable program code on the initiator to transmit another write command with XFR_RDY disabled to the target if the total number of buffers still available on the target is greater than the number of outstanding write commands with the target.

12. The computer program product of claim 10, further comprising computer-usable program code on the initiator to transmit a write command with XFR_RDY enabled if the total number of buffers still available on the target is not greater than the number of outstanding write commands with the target.

13. A system to dynamically enable and disable operation in transfer ready (XFR_RDY) mode, the system comprising:
   an initiator to transmit a write command;
   a target to receive the write command and determine whether XFR_RDY is disabled for the write command, the target comprising a plurality of buffers for processing write commands;
   the target further configured to, in the event XFR_RDY is disabled, determine whether at least one buffer from the plurality of buffers is available on the target;
   the target further configured to, if at least one buffer is available on the target, process the write command by writing data associated with the write command to the at least one buffer;

the target further configured to calculate a total number of buffers that are still available on the target after processing the write command; and the target further configured to transmit the total number to the initiator.

14. The system of claim 13, wherein the target is further configured to, if at least one buffer is not available, discard data associated with the write command.

15. The system of claim 14, wherein the target is further configured to, in the event the data is discarded, return status indicating that the write command failed and should be re-driven with XFR_RDY enabled.

16. The system of claim 13, wherein the initiator is further configured to, prior to transmitting another write command with XFR_RDY disabled to the target, determine if the total number of buffers still available on the target is greater than a number of outstanding write commands with the target.

17. The system of claim 16, wherein the initiator is further configured to transmit another write command with XFR_RDY disabled to the target if the total number of buffers still available on the target is greater than the number of outstanding write commands with the target.

18. The system of claim 16, wherein the initiator is further configured to transmit a write command with XFR_RDY enabled if the total number of buffers still available on the target is not greater than the number of outstanding write commands with the target.

19. A method for dynamically enabling and disabling operation in transfer ready (XFR_RDY) mode, the method comprising:

receiving, at an initiator, information indicating the total number of buffers that are available on a target, the target comprising a plurality of buffers for processing write commands;

determining, at the initiator, if the total number of buffers still available on the target is greater than a number of outstanding write commands the initiator has with the target;

transmitting, by the initiator, a write command with XFR_RDY disabled if the total number of buffers available on the target is greater than the number of outstanding write commands the initiator has with the target; and transmitting, by the initiator, a write command with XFR_RDY enabled if the total number of buffers available on the target is not greater than the number of outstanding write commands the initiator has with the target.

20. The method of claim 19, further comprising re-driving, by the initiator, the write command with XFR_RDY enabled in the event the write command with XFR_RDY disabled fails.

* * * * *